United States Patent
Yamaguchi

(10) Patent No.: US 12,534,068 B2
(45) Date of Patent: Jan. 27, 2026

(54) PARKING ASSISTANCE DEVICE

(71) Applicant: DENSO CORPORATION, Kariya (JP)

(72) Inventor: Shinya Yamaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 204 days.

(21) Appl. No.: 18/359,249

(22) Filed: Jul. 26, 2023

(65) Prior Publication Data

US 2023/0365123 A1 Nov. 16, 2023

Related U.S. Application Data

(63) Continuation of application No. PCT/JP2021/045797, filed on Dec. 13, 2021.

(30) Foreign Application Priority Data

Feb. 1, 2021 (JP) ................................. 2021-014524

(51) Int. Cl.
*B60W 30/06* (2006.01)
*B60W 50/00* (2006.01)
*B60W 50/14* (2020.01)
*G06T 11/00* (2006.01)

(52) U.S. Cl.
CPC ........ *B60W 30/06* (2013.01); *B60W 50/0097* (2013.01); *B60W 50/14* (2013.01); *G06T 11/00* (2013.01); *B60W 2050/146* (2013.01); *B60W 2520/06* (2013.01); *B60W 2540/227* (2020.02)

(58) Field of Classification Search
CPC .. B60W 30/06; B60W 50/0097; B60W 50/14; B60W 2050/146; B60W 2520/06; B60W 2540/227; G06T 11/00; B62D 15/0285
See application file for complete search history.

(56) References Cited

U.S. PATENT DOCUMENTS

| | | | |
|---|---|---|---|
| 10,081,390 B1 * | 9/2018 | Anderson | G08G 1/143 |
| 11,355,011 B1 * | 6/2022 | Khmelev | G08G 1/0129 |
| 2006/0287826 A1 * | 12/2006 | Shimizu | B60Q 1/0023 |
| | | | 701/431 |
| 2015/0057870 A1 * | 2/2015 | Lee | B60W 30/06 |
| | | | 701/23 |

(Continued)

FOREIGN PATENT DOCUMENTS

| | | |
|---|---|---|
| JP | 2009184509 A | 8/2009 |
| JP | 2011016484 A | 1/2011 |

(Continued)

*Primary Examiner* — Sihar A Karwan
(74) *Attorney, Agent, or Firm* — Harness, Dickey & Pierce, P.L.C.

(57) ABSTRACT

A parking assistance device for assisting automatic parking of a vehicle includes a determination unit, an obstacle acquisition unit, a prediction unit, and a notification unit. The determination unit determines a parking area for the automatic parking. The obstacle acquisition unit acquires an obstacle around the determined parking area before the automatic parking. The prediction unit predicts an openable amount, by which a door of the vehicle is openable, based on a detection result of the obstacle acquisition unit when the vehicle is to be automatically parked in the determined parking area. The notification unit notifies the openable amount predicted by the prediction unit.

7 Claims, 5 Drawing Sheets

(56) References Cited

U.S. PATENT DOCUMENTS

| | | | |
|---|---|---|---|
| 2016/0284217 A1* | 9/2016 | Lee | B60K 31/0008 |
| 2017/0229020 A1* | 8/2017 | Colella | B62D 15/0285 |
| 2018/0029591 A1* | 2/2018 | Lavoie | B60W 50/14 |
| 2018/0093619 A1* | 4/2018 | Han | B60R 1/31 |
| 2018/0105184 A1* | 4/2018 | Urano | B60K 31/0008 |
| 2019/0102634 A1 | 4/2019 | Sagami et al. | |
| 2019/0202348 A1* | 7/2019 | Elangovan | B60Q 1/48 |
| 2019/0220001 A1* | 7/2019 | Lavoie | G05D 1/005 |
| 2019/0283738 A1* | 9/2019 | Hüger | B60W 30/06 |
| 2020/0041992 A1* | 2/2020 | Nagashima | G06F 3/04847 |
| 2020/0086851 A1* | 3/2020 | Krekel | B62D 1/00 |
| 2020/0307626 A1* | 10/2020 | Noguchi | B60W 50/082 |

FOREIGN PATENT DOCUMENTS

| | | |
|---|---|---|
| JP | 20120033591 A | 2/2012 |
| JP | 2015229400 A | 12/2015 |
| JP | 2018106479 A | 7/2018 |
| JP | 2019067220 A | 4/2019 |

* cited by examiner

FIG. 2
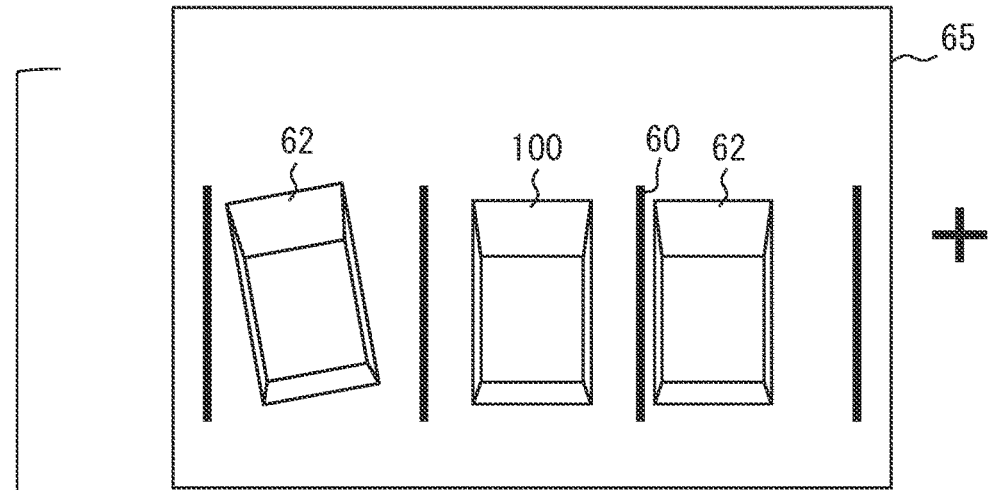
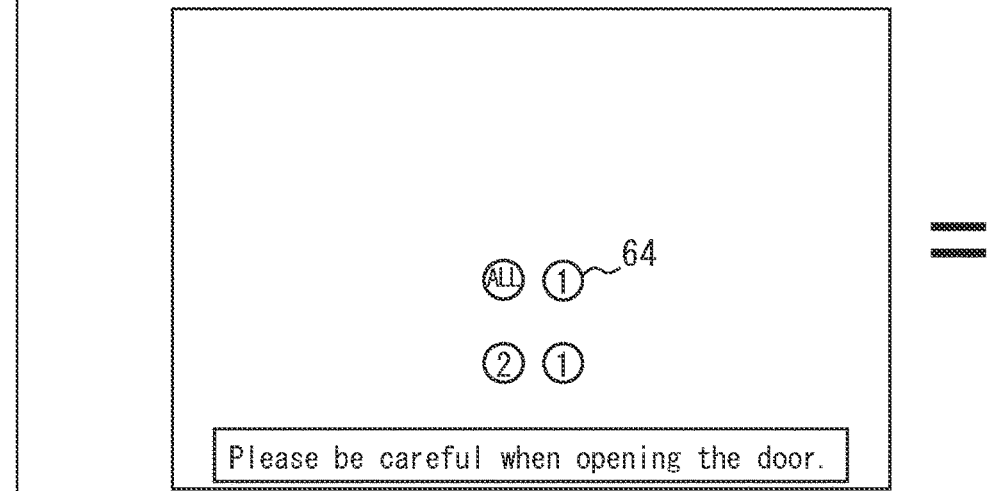
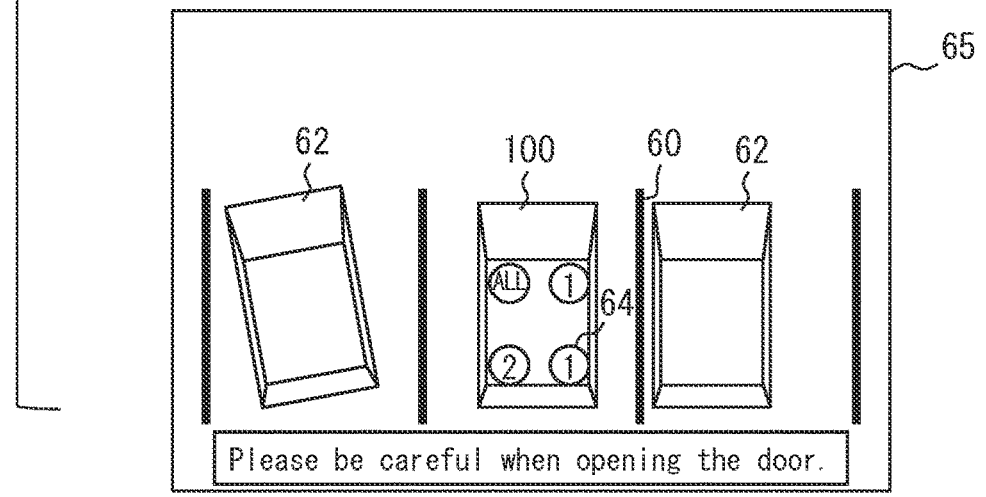

FIG. 3
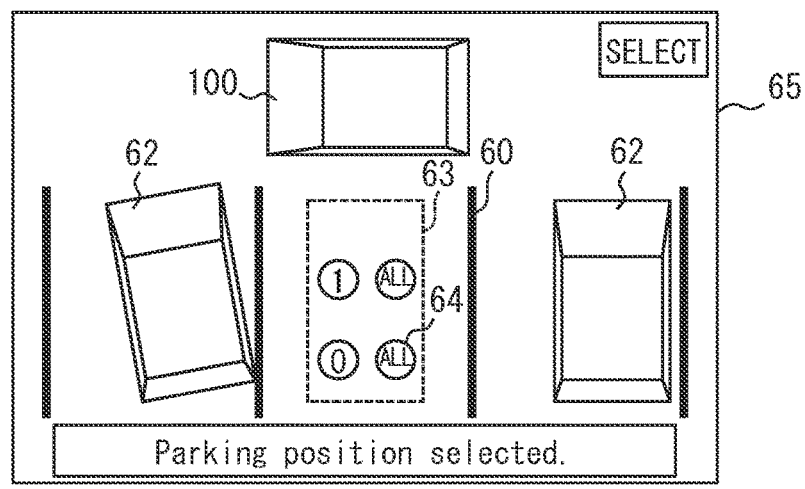
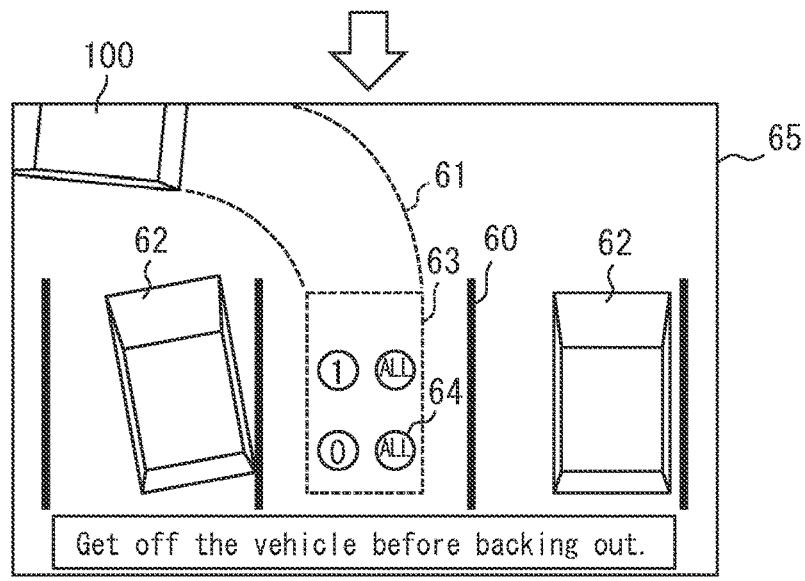
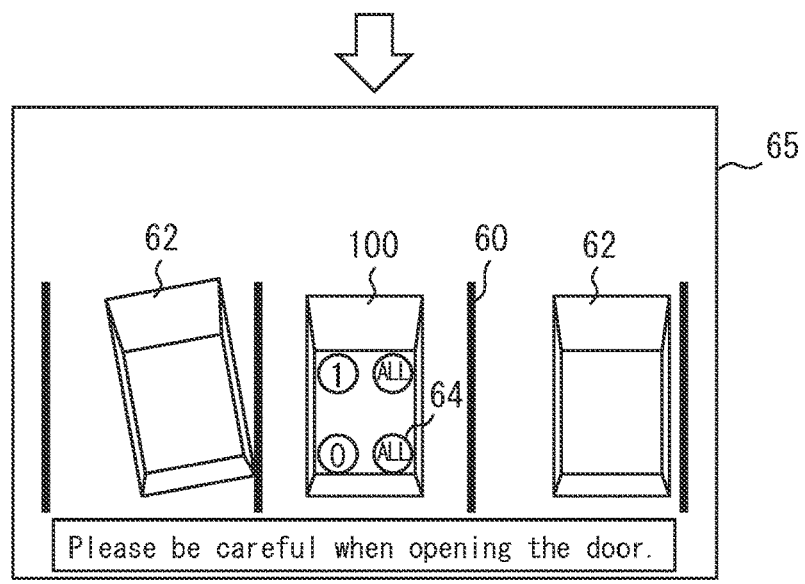

PARKING ASSISTANCE DEVICE

CROSS REFERENCE TO RELATED APPLICATIONS

The present application is a continuation application of International Patent Application No. PCT/JP2021/045797 filed on Dec. 13, 2021, which designated the U.S. and claims the benefit of priority from Japanese Patent Application No. 2021-014524 filed on Feb. 1, 2021. The entire disclosures of all of the above applications are incorporated herein by reference.

TECHNICAL FIELD

The present disclosure relates to a parking assistance device.

BACKGROUND

In a driving assistance device, when a vehicle is parked, an image of surroundings of the vehicle is captured using a camera.

SUMMARY

According to at least one embodiment, a parking assistance device for assisting automatic parking of a vehicle includes a determination unit, an obstacle acquisition unit, a prediction unit, and a notification unit. The determination unit determines a parking area for the automatic parking. The obstacle acquisition unit acquires an obstacle around the determined parking area before the automatic parking. The prediction unit predicts an openable amount, by which a door of the vehicle is openable, based on a detection result of the obstacle acquisition unit when the vehicle is to be automatically parked in the determined parking area. The notification unit notifies the openable amount predicted by the prediction unit.

BRIEF DESCRIPTION OF DRAWINGS

The details of one or more embodiments are set forth in the accompanying drawings and the description below. Other features and advantages will be apparent from the description and drawings, and from the claims.

FIG. 2 is an example of an image displayed after parking.

FIG. 3 is an example of an image displayed at a time of parking.

DETAILED DESCRIPTION

To begin with, examples of relevant techniques will be described.

In a driving assistance device according to a comparative example, when a vehicle is parked, an image of surroundings of the vehicle is captured using a camera, and a bird's-eye view image that is easy for a driver to see is generated and displayed. In addition, a distance between the vehicle and an obstacle is measured, and information indicating that the door cannot be opened after parking or can only be half-opened depending on a positional relationship between the vehicle and the obstacle is displayed. Thus, the occupant can grasp the positional relationship between the door of the vehicle and the obstacle, and can perform the opening and closing operation of the door so that the door does not come into contact with the obstacle.

In the driving assistance device according to the comparative example, the occupant can grasp whether the door and the obstacle come into contact with each other when the door is opened after parking. However, when the obstacle and the door are close to each other, there is an issue that the occupant cannot open the door and cannot get on and off the vehicle.

In contrast to the comparative example, according to a parking assistance device of the present disclosure, whether a door can be opened or closed before automatic parking can be predicted.

According to one aspect of the present disclosure, a parking assistance device for assisting automatic parking of a vehicle includes a determination unit, an obstacle acquisition unit, a prediction unit, and a notification unit. The determination unit determines a parking area for the automatic parking. The obstacle acquisition unit acquires an obstacle around the determined parking area before the automatic parking. The prediction unit predicts an openable amount, by which a door of the vehicle is openable, based on a detection result of the obstacle acquisition unit when the vehicle is to be automatically parked in the determined parking area. The notification unit notifies the openable amount predicted by the prediction unit.

According to this configuration, the obstacle acquisition unit detects the obstacle around the determined parking area before the automatic parking. Then, the prediction unit predicts the openable amount by which the door of the vehicle openable when the vehicle is automatically parked in the parking area. As a result, since the openable amount is notified by the notification unit before parking, the occupant can recognize the openable amount before parking. Thus, the user can know before parking whether it is possible to get on and off with the determined parking area, and convenience can be improved.

First Embodiment

Figure 1:
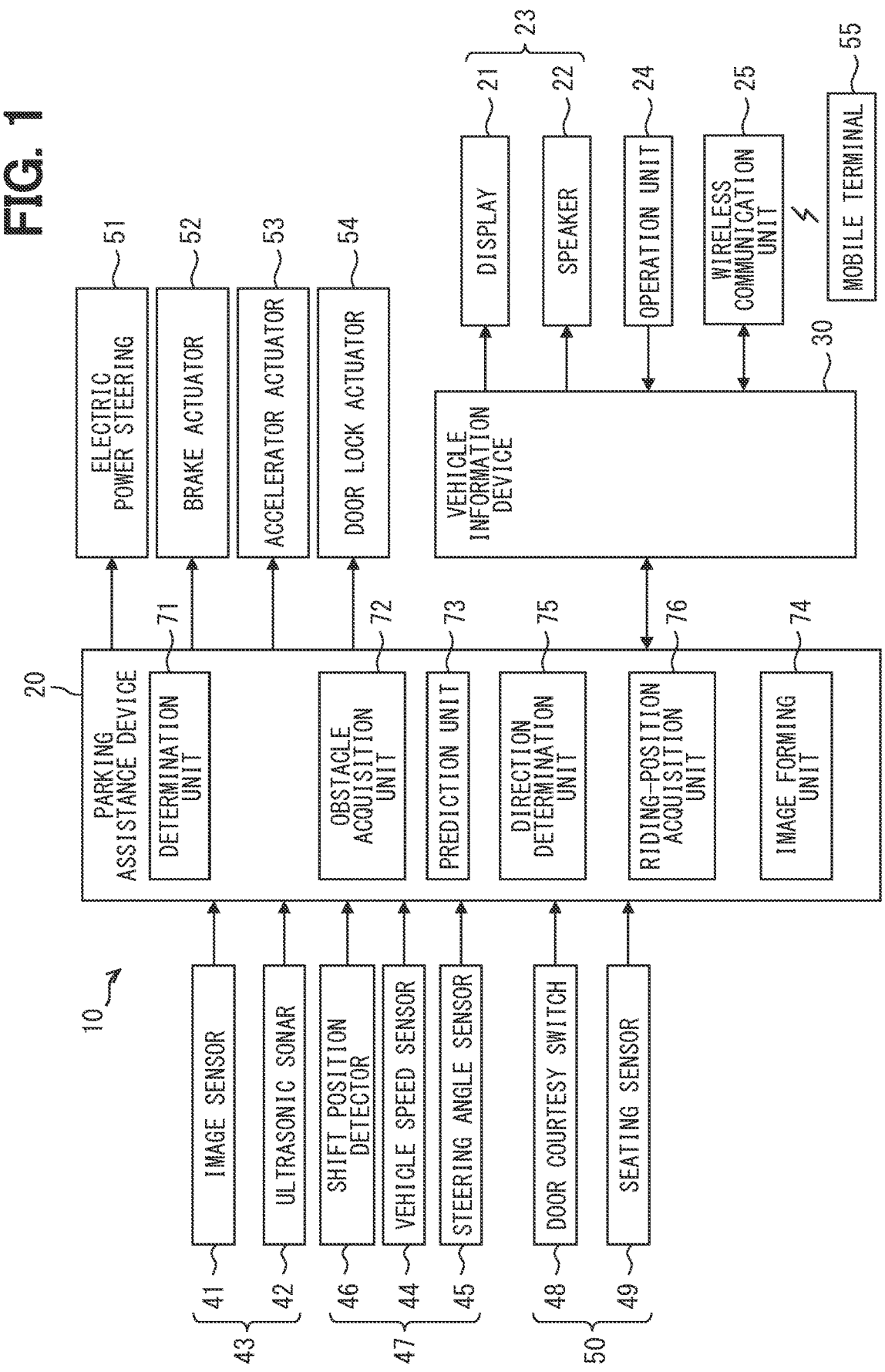
FIG. 1 is a block diagram illustrating a parking assistance system.

Hereinafter, a first embodiment of the present disclosure will be described with reference to FIGS. 1 to 6. The parking assistance system 10 of the present embodiment is used for a vehicle 100, and includes a parking assistance device 20 and a vehicle information device 30. As shown in FIG. 1, the parking assistance device 20 receives various sensor data and outputs a control signal for assisting automatic parking to an actuator. The sensor data are output by a peripheral monitoring sensor 43 such as an image sensor 41 and an ultrasonic sonar 42, a vehicle state sensor 47 such as a vehicle speed sensor 44, a steering angle sensor 45, and a shift position detector 46, and an occupant sensor 50 such as a door courtesy switch 48 and a seating sensor 49.

The parking assistance device 20 is connected to an electric power steering 51, a brake actuator 52, an accelerator actuator 53, and a door lock actuator 54, and outputs control signals to these components. The parking assistance device 20 calculates the sensor data and controls each unit to automatically perform forward movement, stop, backward movement, and steering of the vehicle 100 without a driver's operation at a time of parking.

The vehicle information device 30 is connected to the parking assistance device 20 and calculates information output by the parking assistance device 20. The vehicle information device 30 is connected to a notification unit 23 such as a display 21 and a speaker 22, an operation unit 24, and a wireless communication unit 25. The vehicle information device 30 outputs the calculation result from the notification unit 23. The vehicle information device 30 calculates information operated by the driver using the operation unit 24 such as a steering wheel, a brake pedal, or an accelerator pedal, and outputs the information to the parking assistance device 20.

The peripheral monitoring sensor 43 monitors a periphery of the own vehicle. The peripheral monitoring sensor 43 senses a periphery of the vehicle. The peripheral monitoring sensor 43 includes the image sensor 41 and the ultrasonic sonar 42. The image sensor 41 is an imaging device that images the periphery of the vehicle. Four image sensors 41 are arranged to capture images in four directions of the vehicle including a front direction, a rear direction, a left direction, and a right direction. A bird's-eye view image 65 in which the host vehicle is viewed from above as a synthesize image can be displayed since the four image sensor 41 capture images in the four directions.

The ultrasonic sonar 42 detects a distance from the own vehicle to a ranging point on an object by transmitting a probe wave and receiving a reflected wave. The reflected wave is generated when the probe wave is reflected on the object. The ranging point is a location on the surface of the object where the probe wave is reflected. The sensing range of the ultrasonic sonar 42 is a predetermined range around the vehicle 100, for example, several meters.

The vehicle state sensor 47 is a sensor group for detecting a traveling state of the vehicle. The vehicle state sensor 47 includes the vehicle speed sensor 44, the steering angle sensor 45, the shift position detector 46, and the like. The vehicle speed sensor 44 detects a vehicle speed of the vehicle. The steering angle sensor 45 detects a steering angle of the vehicle. The shift position detector 46 detects a shift position of the vehicle. The vehicle state sensor 47 outputs the detection result to the parking assistance device 20.

The occupant sensor 50 is a sensor for detecting information related to an occupant. The occupant sensor 50 includes the door courtesy switch 48 and the seating sensor 49. The door courtesy switch 48 detects opening and closing of the doors of the vehicle 100. The seating sensor 49 detects a seating position of the occupant. The occupant sensor 50 outputs a detection result to the parking assistance device 20.

The notification unit 23 notifies information to a vehicle compartment of the vehicle 100. The notification unit 23 includes the display 21 that displays an image and the speaker 22 that outputs sound. The display 21 notifies information by displaying an image. The display 21 is provided in the vehicle compartment. Examples of the display 21 include a meter multi information display (hereafter referred to as meter MID), a center information display (hereafter referred to as CID), and a display of vehicle navigation device. The display 21 also includes a display provided in each seat. The speaker 22 notifies information by voice. The speaker 22 is provided in the vehicle compartment. The speaker 22 may be provided by an audio speaker or the like.

The operation unit 24 is an intention input unit that receives an operation made by an occupant of the vehicle. The operation unit 24 includes an automatic parking switch that receives an input to start automatic parking. The operation unit 24 includes a voice input device that receives voice input. In addition, the operation unit 24 includes a function switching switch for switching a mode of parking assistance.

The parking assist mode may include an automatic parking, a manual parking assist, and no parking assist. The automatic parking is a mode in which a parking assist is performed by automated driving the vehicle 100 to a parking area 60. The automatic parking includes semi-automatic parking in which a user performs an accelerator operation or a brake operation without performing steering, and fully automatic parking in which the user does not perform any operation. The manual parking assist is a mode in which a parking assist is performed by displaying a parking route 61 of the vehicle, which changes corresponding to a steering angle of the vehicle, on a traveling direction image of the vehicle in superimposed manner. The no parking assist is a mode in which neither the automatic parking nor the manual parking assist is performed.

The wireless communication unit 25 is a communication module for communicating with a mobile terminal 55 located outside. The wireless communication unit 25 is a communication module that has a role of a physical layer in a wireless communication protocol such as LTE, for example. The wireless communication unit 25 includes an antenna that can transmit and receive radio waves in a frequency band used in LTE, and a transceiver that executes signal processing equivalent to conversion from baseband signals to high-frequency signals and vice versa in accordance with LTE communication standard. The wireless communication unit 25 generates a carrier signal corresponding to data input from the vehicle information device 30, by executing processing such as coding, modulation, and digital-to-analog conversion on the input data. Then, the wireless communication unit 25 outputs the generated carrier signal to the antenna to radiate the carrier signal as a radio wave. The wireless communication unit 25 also executes predetermined processing such as analog-to-digital conversion processing and demodulation processing on a received signal received with the antenna, to convert the received signal into an information sequence (that is, digital data) represented by a digital value. Then, the data corresponding to the received signal is output to the vehicle information device 30.

Next, the actuator controlled by the parking assistance device 20 will be described. The electric power steering 51 performs steering based on a control signal of the parking assistance device 20. The brake actuator 52 actuates a brake based on a control signal of the parking assistance device 20. The accelerator actuator 53 actuates an accelerator based on a control signal of the parking assistance device 20. The door lock actuator 54 actuates a door lock based on a control signal of the parking assistance device 20.

The parking assistance device 20 executes a program stored in a storage medium to control each unit. The parking assistance device 20 includes at least one calculation processing device (i.e., CPU), and the storage medium for storing a program and data. The parking assistance device 20 is provided by a microcontroller including a computer-readable storage medium. The storage medium is a non-transitory tangible storage medium that stores computer-readable programs and data non-temporarily. The storage medium is realized by a semiconductor memory, a magnetic disk, or the like.

As described above, the parking assistance device 20 also performs vehicle control such as acceleration-deceleration control and steering control of the vehicle for parking. More specifically, the parking assistance device 20 outputs control signals to the brake actuator 52, the accelerator actuator 53, and the door lock actuator 54 to perform forward movement, stop, backward movement, and steering of the vehicle 100.

The parking assistance process executed by the parking assistance device 20 may be applied to any parking mode of the vehicle 100. The parking assistance process is applied to, for example, parking in a garage, parallel parking, and lateral parking.

The parking assistance device 20 executes the parking assistance process to display an opening amount by which the door can be opened on the display 21. The opening amount indicates a range in which the door does not collide with an obstacle 62 existing around the door after the vehicle 100 is parked.

The parking assistance device 20 includes, as functional blocks, a determination unit 71, an obstacle acquisition unit 72, a prediction unit 73, an image forming unit 74, a direction determination unit 75, and a riding-position acquisition unit 76. The riding-position acquisition unit 76 acquires a riding position of the occupant based on the seating sensor 49.

The obstacle acquisition unit 72 recognizes obstacles 62 and parking area lines around the vehicle based on sensing results successively sensed by the peripheral monitoring sensor 43. The obstacles 62 around the vehicle also include the obstacles 62 around the parking area lines. The obstacle acquisition unit 72 detects the obstacles 62 and the parking area lines by performing image recognition processing such as edge detection and pattern matching on the captured image of the image sensor 41. The obstacle acquisition unit 72 detects positions of the obstacles 62 and the parking area lines with respect to the vehicle based on an installation position of the image sensor 41 with respect to the vehicle, a direction of an optical axis, and a position in the captured image. A method using a stereo camera may be employed as the image sensor 41. Therefore, the plurality of image sensors 41 simultaneously image the obstacle 62 from different positions. Thus, information in a depth direction of the obstacle 62 is measured from a parallax of the plurality of captured images.

The obstacle acquisition unit 72 detects the obstacle 62 from the detection result of the ultrasonic sonar 42 based on whether the reflected wave with respect to the probe wave is received. Further, the obstacle acquisition unit 72 detects a direction of the obstacle 62 with respect to the vehicle based on a direction in which the ultrasonic sonar 42 transmits the probe wave. The obstacle acquisition unit 72 detects a distance from the vehicle to the obstacle 62 based on a time elapsed from when the probe wave is transmitted until when the reflected wave is received. A position of the obstacle 62 relative to the vehicle is represented as coordinates in a XY coordinate system with a reference point of the vehicle as an original point. In this XY coordinate system, an X-axis and a Y-axis are set on a horizontal plane parallel to a road surface.

The obstacle acquisition unit 72 recognizes the parking area 60 based on a recognition result of the obstacles 62 and the parking area lines existing around the vehicle. For example, an area sandwiched between the parking area lines is recognized as the parking area 60 in which parking is possible when the obstacle 62 and the parking area lines are detected using the image sensor 41. When the obstacles 62 are detected by the ultrasonic sonar 42, by specifying an outline shape of the obstacles 62 from time-series data of the reflection points of the obstacle 62, an area sandwiched by or in contact with the obstacles 62 is recognized as the parking area 60 in which parking is possible.

The determination unit 71 determines the parking area 60 for automatic parking. Then, the determination unit 71 sets a target parking position 63 in a situation the vehicle is to be park in the parking area 60 recognized by the obstacle acquisition unit 72 when the automatic parking is selected as the mode of the parking assistance. The parking area 60 may be the parking area 60 recognized by the obstacle acquisition unit 72, or the user may operate the operation unit 24 to determine the parking area 60.

The target parking position 63 is determined such that the vehicle fits in the parking area 60 recognized by the obstacle acquisition unit 72. For example, the target parking position 63 is determined such that the vehicle is positioned at a center of the parking area 60. The target parking position 63 may be determined so that a larger space can be taken on a driver's seat side. Then, the determination unit 71 calculates a parking route 61 along which the vehicle should travel so that the vehicle can be parked at the target parking position 63. The parking route 61 may be a route of each wheel of the vehicle, or a route of each of a left and right outermost portion of the vehicle body of the vehicle. The parking route 61 is set such that the closest distance to the obstacle 62 is equal to or greater than a predetermined distance. The predetermined distance is a distance that is not extremely close to the obstacle 62, and the predetermined distance may be properly set. The determination unit 71 causes each actuator to automatically perform acceleration, braking, and steering of the vehicle based on the generated parking route 61, thereby executing automatic parking.

The obstacle acquisition unit 72 also detects an obstacle 62 related to the parking area 60 determined by the determination unit 71 and the parking route 61 calculated by the determination unit 71. More specifically, the obstacle acquisition unit 72 acquires the obstacle 62 around the parking area 60 determined before the automatic parking. Further, the obstacle acquisition unit 72 detects an obstacle 62 around the parking route 61 at the time of automatic parking.

The obstacle acquisition unit 72 further detects a ground condition of the parking area 60 and a ground condition of the parking route 61. The obstacle acquisition unit 72 generates a virtual space in which a periphery environment of the parking area 60 and the parking route 61 is three-dimensionally reproduced from a plurality of ranging point groups obtained by the ultrasonic sonar 42, for example, to detect a ground condition such as a step. The obstacle acquisition unit 72 detects a ground condition such as a puddle by performing image recognition processing on a captured image obtained by the image sensor 41, for example. A ground condition also includes detection of a height difference with respect to the road surface, such as a step and a depression.

The prediction unit 73 predicts, using the detection result of the obstacle acquisition unit 72, an openable amount by which the door of the vehicle 100 can be opened when the vehicle is automatically parked in the determined parking area 60. The prediction unit 73 determines the opening amount of the door that can be opened within a range in which the door does not collide with the surrounding obstacle 62 when the door is opened. For example, the prediction unit 73 determines, based on coordinates of the obstacle 62 created by the obstacle acquisition unit 72, a presence or absence of the obstacle 62 that interferes with the door when the door is opened in a open region from a position where each door of the vehicle 100 is closed to a position where each door is maximally opened when the host vehicle is to be parked in the parking area 60.

For example, the prediction unit 73 predicts the openable amount of the door when an obstacle 62 such as a wall that interferes with the door is present around the door of the vehicle 100 after automatic parking. The openable amount of the door is calculated based on a rotation angle until the door interferes with the obstacle 62 with a hinge of the door as a rotation center. For example, the openable amount when the door is fully opened is set to 100%, the openable amount when the door is fully closed is set to 0%, and the openable amount is determined by what percentage.

The prediction unit 73 determines whether riding or stepping down is possible based on the predicted openable amount. Therefore, when the openable amount after the automatic parking is less than 100%, the prediction unit 73 determines whether the user can get on or off the vehicle after the automatic parking. For example, when the openable amount is 50% or less, the openable amount is an amount at which getting on or off the vehicle is difficult. The prediction unit 73 compares a threshold of the openable amount set in advance with a predicted threshold of the openable amount to determine whether getting on or off the vehicle is difficult. The prediction unit 73 predicts not only the openable amount at the target parking position 63 determined by the determination unit 71 but also the openable amount at each point of the parking route 61.

The prediction unit 73 not only predicts the openable amount before the automatic parking but also continuously predicts the openable amount even while the vehicle 100 is moving for parking after the automatic parking is started. This is to improve prediction accuracy of the openable amount since a position of the vehicle 100 changes.

Further, the prediction unit 73 predicts the openable amount for both cases of forward parking and backward parking. This is because, in the case of forward parking and backward parking, a position of the door after parking is different, and thus the openable amount for each door may change. Then, the prediction unit 73 determines whether the openable amount of the door corresponding to the occupant position detected by the riding-position acquisition unit 76 is larger in forward parking or backward parking.

The direction determination unit 75 determines whether a direction of the vehicle 100 to be automatically parked is forward or backward. The forward parking refers to parking while moving forward with respect to the parking area 60. The backward parking is parking while moving backward with respect to the parking area 60. Therefore, the direction determination unit 75 determines whether the parking is forward parking or backward parking. In a case where both the forward parking and the backward parking are permitted, since the position of the door with respect to the parking area 60 is different between the forward parking and the backward parking, the direction of the vehicle 100 is determined that an occupant is easy to get in or out the vehicle. The direction determination unit 75 determines the direction of the vehicle 100, in which the openable amount of the door corresponding to the occupant position detected by the riding-position acquisition unit 76, is large. For example, when an occupant is located on the driver's seat and the passenger's seat, and the openable amount of the door on the driver's seat is the same in forward parking and backward parking, but the openable amount of the door on the passenger's seat is larger in forward parking than in backward parking, the direction is determined to be forward parking. Further, for example, in a case where an occupant is located on the driver's seat and the passenger's seat, the openable amount of the door of the passenger's seat is the same between backward parking and forward parking, and the openable amount of the door on the driver's seat is larger in backward parking than in forward parking, the direction is determined to be backward parking.

Further, for example, even in a case where the openable amount of the door corresponding to the occupant position is large, when the smaller openable amount secures a width necessary for getting on and off, either the backward parking or the forward parking may be selected.

The image forming unit 74 artificially generates a bird's-eye view image 65 in which the vehicle 100 and the periphery of the vehicle 100 are viewed from above. Further, the image forming unit 74 generates an image in which a door-opening degree image 64 indicating the openable amount predicted by the prediction unit 73 is superimposed in the parking area 60 determined in the generated bird's-eye view image 65.

The image forming unit 74 generates the bird's-eye view image 65 obtained by combining imaging data of the image sensor 41. As shown in FIG. 2, the bird's-eye view image 65 is an image displayed as if looking down from a virtual viewpoint defined above the vehicle 100. In FIG. 2, the vehicle 100 at a middle area in a left-right direction represents the host vehicle 100. The top, bottom, left, and right in the bird's-eye view image 65 respectively correspond to the front, rear, left, and right of the actual vehicle 100. As the bird's-eye view image 65, an image obtained by performing viewpoint conversion on captured data of each camera is generated and displayed in real time around an own vehicle image that simulates the vehicle.

The image forming unit 74 generates the door-opening degree image 64 in which an image indicating the openable amount at a current position shown in the center of FIG. 2 is superimposed on the bird's-eye view image 65 shown at the top of FIG. 2. For example, as shown in FIG. 2, the openable amount is indicated by characters such as "all", "0", "1", and "2" as a door opening degree. These characters in FIG. 2 are obtained by dividing the openable amount for each stage as the door opening degree, and the openable amount decreases in the order of the door opening degree max, the door opening degree 2, the door opening degree 1, and the door opening degree 0. In other words, the door opening degree all is an opening degree at which the door can be fully opened, the door opening degree 2 is an opening degree at which the door cannot be fully opened but getting on and off is sufficiently possible, the door opening degree 1 is an opening degree at which getting on and off can be managed, and the door opening degree 0 is an opening degree at which getting on and off is difficult. In FIG. 2, the total door opening degree all is indicated by "ALL", the door opening degree 2 is indicated by "2", the door opening degree 1 is indicated by "1", and the door opening degree 0 is indicated by "0".

As shown in FIG. 3, the image forming unit 74 further overlaps images of the parking route 61, the target parking position 63, and the like. The parking route 61 is drawn linearly and is superimposed on the bird's-eye view image 65 in an opaque state. The parking route 61 is displayed downward corresponding to the rear in the traveling direction with respect to the own vehicle image when the vehicle 100 moves backward. The parking route 61 is sequentially deformed according to steering angle information acquired from the steering angle sensor 45, that is, the steering angle of the steered wheels, and indicates a range in which the vehicle 100 moves when the current steering angle is maintained.

The target parking position 63 is drawn linearly and is superimposed on the bird's-eye view image 65 in an opaque state. The target parking position 63 is displayed in a rectangular frame shape slightly larger than the own vehicle image. The target parking position 63 indicates a position determined or set by the determination unit 71 as in the uppermost image of FIG. 3. The target parking position 63 can be moved in the bird's-eye view image 65 by a user operation on the display 21. The user can set the target parking position 63 of the parking assist function at which the vehicle is parked by an operation of moving the target parking position 63.

As shown in FIG. 3, after the parking area 60 is selected, the image forming unit 74 forms a door-opening degree image 64 on which an image indicating the openable amount at the target parking position 63 is superimposed. Therefore, the user can recognize the openable amount at the target parking position 63 before parking. In the image shown in FIG. 3, the opening degree of the door of a left rear seat is 0. Therefore, since getting off the vehicle is difficult, the occupant is prompted to get off the vehicle before the automatic parking by the sound and the image. Further, after parking, the door opening degree is displayed in the same manner as in FIG. 2 described above, so that the user can pay attention to getting off the door having a small opening degree.

Figure 4:
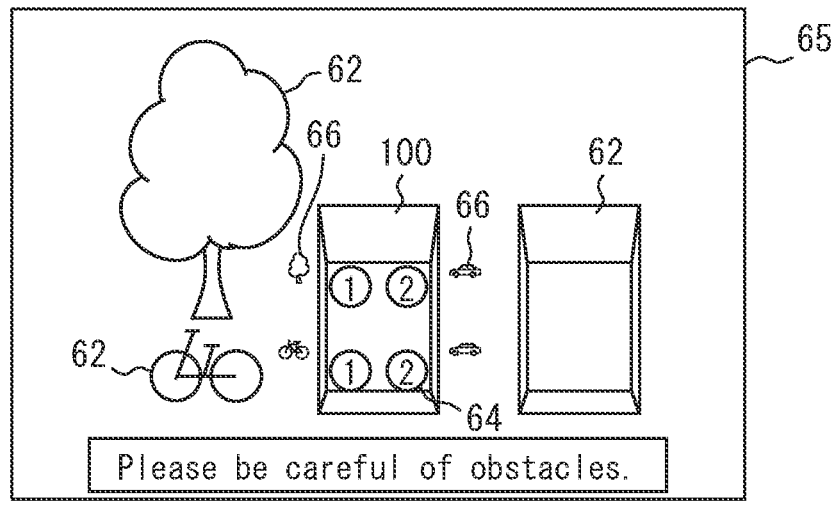
FIG. 4 is an example of an image displaying an obstacle.

In addition, as shown in FIG. 4, the image forming unit 74 may superimpose not only the door-opening degree image 64 but also an obstacle image 66 indicating the type and state of the obstacle 62 interfering with the door by numbers, characters, figures, and the like. Thus, even in a case where the user is difficult to see the outer periphery from the inside of the vehicle such as at night, the user can recognize what kind of obstacle 62 causes the openable amount to be small by the image. In FIG. 4, for example, when the obstacle 62 is a car, an image of the car is displayed outside the corresponding door. Similarly, when the obstacle 62 is a tree, an image of the tree is displayed, and when the obstacle 62 is a bicycle, an image of the bicycle is displayed.

Figure 5:
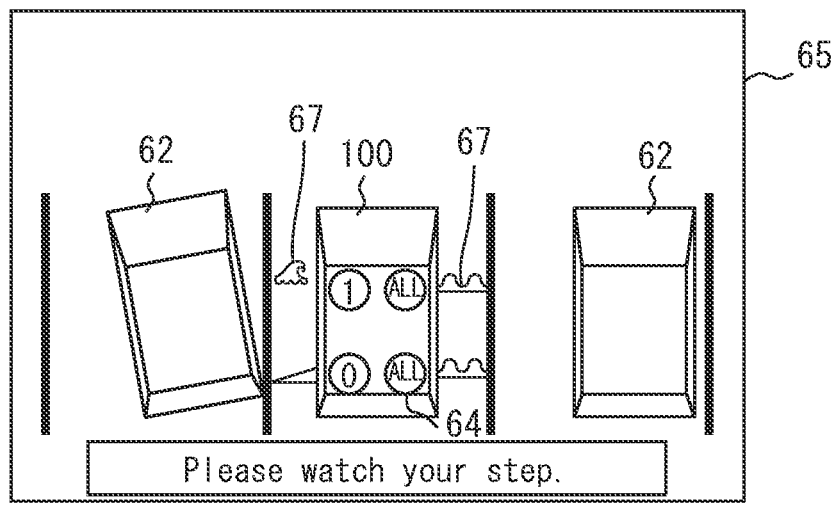
FIG. 5 is an example of an image displaying a ground condition.

Further, as shown in FIG. 5, the image forming unit 74 may superimpose not only the door-opening degree image 64 but also a ground image 67 indicating the type and state of the ground condition near the door by numbers, characters, figures, and the like. As a result, even in a case where the user is difficult to see the outer periphery from the inside of the vehicle such as at night, the user can recognize what kind of ground condition is by the image. In FIG. 5, for example, when the ground condition is a puddle, an image associated with the puddle is displayed outside the corresponding door. Similarly, when the ground condition is an inclination, an image of the inclination is displayed, and when the ground condition is a step or unevenness, an image of the unevenness is displayed.

The notification unit 23 notifies the openable amount predicted by the prediction unit 73. More specifically, as shown in FIG. 3, the display 21 notifies the openable amount by superimposing the bird's-eye view image 65 and the door-opening degree image 64. The notification unit 23 notifies a point of the openable amount at which the user can get on or off the vehicle on the parking route 61 when the prediction unit 73 determines that the openable amount after the automatic parking is small and the user can not get on or off the vehicle after the automatic parking. This is to prompt the user to get on and off in advance.

The notification unit 23 further notifies the ground condition detected by the obstacle acquisition unit 72. The notification unit 23 causes the display 21 to display the ground condition as a caution display when the obstacle acquisition unit 72 detects a ground condition to which the user should pay attention in the vicinity of the door, that is, at a position through which the user passes at the time of getting on and off. The notification unit 23 displays the ground condition in the vicinity of the corresponding door by using the ground image 67 such as a recognizable display mark or symbol such as unevenness of a road surface, an inclination of a road surface, or a puddle.

In addition, the vehicle information device 30 transmits information on the openable amount to a predetermined mobile terminal 55 via the wireless communication unit 25. The predetermined mobile terminal 55 includes not only a user who is on board but also a user who is going to get on the vehicle. Since the user who is going to get in the vehicle can check the openable amount using the mobile terminal 55, the user can easily recognize the door that is easy to get in the vehicle before parking the vehicle, and can move to a position where the user can easily get in the vehicle.

Figure 6:
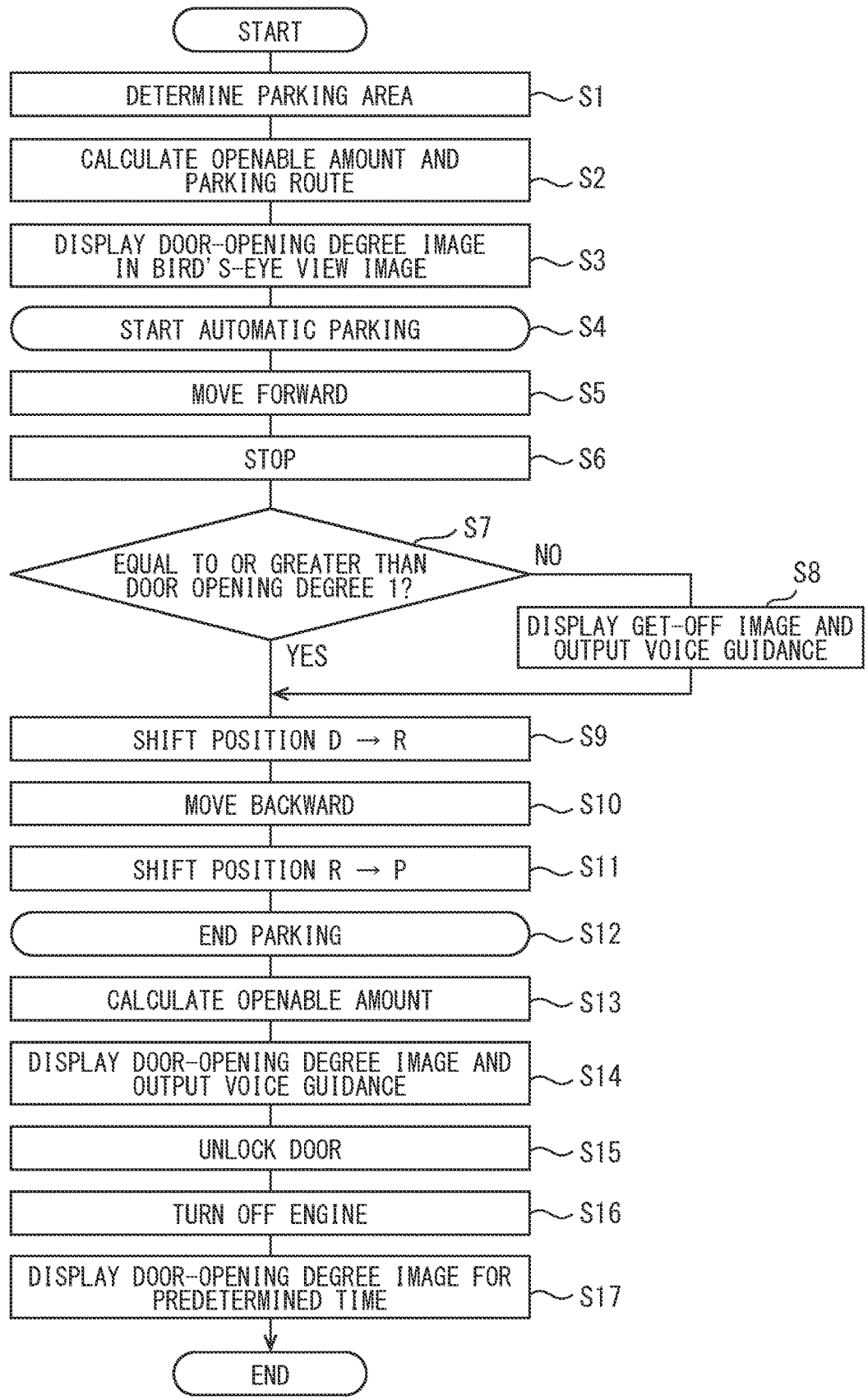
FIG. 6 is a flowchart of an automatic parking process.

Next, the automatic parking process of the parking assistance device 20 will be described with reference to FIG. 6. The flow shown in FIG. 6 is repeatedly executed in a short time when the parking assistance device 20 is set to the automatic parking mode in the power-on state.

In step S1, the determination unit 71 determines the parking area 60, and the process proceeds to step S2. In step S2, the prediction unit 73 calculates the openable amount of the door in the parking route 61 and the target parking position 63, and the process proceeds to step S3.

In step S3, the image forming unit 74 forms the door-opening degree image 64 indicating the openable amount in the bird's-eye view image 65, and the process proceeds to step S4. As a result, the image shown at the top of FIG. 3 is displayed.

In step S4, a series of processes related to the automatic parking is started, and the process proceeds to step S5. In step S5, the actuator is controlled to move forward to a predetermined position for back parking, and the process proceeds to step S6. In step S6, the vehicle stops at the predetermined position, and the process proceeds to step S7.

In step S7, it is determined whether the openable amount at the current position is equal to or greater than the door opening degree 1. When the openable amount is equal to or greater than the door opening degree 1, the process proceeds to step S9. When the openable amount is not equal to or greater than the door opening degree 1, the process proceeds to step S8.

In step S8, since the door opening degree is not equal to or greater than 1, that is, the door opening degree is 0, the display 21 and the speaker 22 are controlled to prompt the user to get off the vehicle at the current position, and the process proceeds to step S9. As a result, an image shown in the center of FIG. 3 is displayed. In step S8, all the occupants may be prompted to get off, or only the occupants corresponding to the door with the door opening degree of 0 may be prompted to get off.

In step S9, the shift position is switched from a drive position to a reverse position in order to perform back parking in the parking area 60, and the process proceeds to step S10. In step S10, the vehicle moves backward at a predetermined steering angle, parks at the target parking position 63, and proceeds to step S11.

In step S11, the shift position is switched from the reverse position to a parking position, and the process proceeds to step S12. In step S12, the series of parking control from step 4 is ended, and the process proceeds to step S13.

In step S13, the openable amount at the current position is calculated, and the process proceeds to step S14. In step S14, the image forming unit 74 superimposes the door-opening degree image 64 indicating the openable amount on the bird's-eye view image 65, and the process proceeds to step S15. As a result, the lowermost image in FIG. 3 is displayed. In step S14, the speaker 22 is controlled to output voice guidance corresponding to the openable amount. That is, the display 21 and the speaker 22 are controlled so as to prompt a position of the door that has a small openable amount and is difficult to exit.

In step S15, since the parking is completed, the door is unlocked, and the process proceeds to step S16. In step S16, an engine is turned off, and the process proceeds to step S17. In step S17, the display 21 is controlled such that the openable amount is displayed in the bird's-eye view image 65 for a predetermined time even after the engine is turned off, and the process terminates.

In this way, before the automatic parking is performed, the openable amount of the door when the vehicle is parked in the determined parking area 60 is predicted, and when the user is difficult to get off the vehicle, the driver is prompted to get off the vehicle before the parking by the bird's-eye view image 65, the door-opening degree image 64, and the voice. The driver is prompted to pay attention by the bird's-eye view image 65, the door-opening degree image 64, and the voice when the door cannot be fully opened after parking.

As described above, according to the parking assistance device 20 of the present embodiment, before the automatic parking, the obstacle 62 around the determined parking area 60 is detected by the obstacle acquisition unit 72. Then, the prediction unit 73 predicts the openable amount of the door when the vehicle is automatically parked in the determined parking area 60. As a result, since the openable amount is notified by the notification unit 23 before parking, the occupant can recognize the openable amount before parking. Thus, the user can know before parking whether it is possible to get on and off with the determined parking area 60, and convenience can be improved.

In the present embodiment, the obstacle acquisition unit 72 detects the obstacle 62 around the parking route 61 when the automatic parking is performed. Then, the prediction unit 73 predicts the openable amount at each point of the parking route 61, and determines whether the user can get on or off after the automatic parking based on the predicted openable amount. Thus, the parking assistance device 20 is capable of prompting the user to get in or out of the vehicle not only before parking and after parking but also at a timing when there is a margin in the openable amount.

Further, in the present embodiment, the obstacle acquisition unit 72 further detects the ground condition of the parking area 60. Since the ground condition detected by the obstacle acquisition unit 72 is notified, the user can recognize not only the obstacle 62 but also the ground condition. In addition, since the ground condition around the parking route 61 is detected in addition to the parking area 60, when the ground condition is bad after parking, the parking assistance device 20 is capable of prompting the user to get on and off at a point where the ground condition is preferable.

In the present embodiment, the prediction unit 73 predicts the openable amount for both cases of forward parking and backward parking. Then, the direction determination unit 75 determines the direction of the vehicle 100 in which the openable amount of the door corresponding to the detected occupant position is large. As a result, the vehicle 100 can be parked in a direction in which the user is easy to get on and off the vehicle.

Further, in the present embodiment, the image forming unit 74 generates the bird's-eye view image 65 in a pseudo manner, and generates an image in which an image indicating the openable amount predicted by the prediction unit 73 is superimposed in the parking area 60 determined in the generated bird's-eye view image 65. Thus, the user can easily recognize the openable amount.

Other Embodiments

The present disclosure is not limited to the preferred embodiments of the present disclosure described above. Various modifications may be made without departing from the subject matters of the present disclosure.

It should be understood that the configurations described in the above-described embodiments are example configurations, and the present disclosure is not limited to the foregoing descriptions. The scope of the present disclosure encompasses claims and various modifications of claims within equivalents thereof.

In the first embodiment described above, the prediction unit 73 predicts the openable amount before the start of parking, but the prediction is not limited to the prediction before the start of parking, and the openable amount may be continuously predicted while automatic parking is started and the vehicle 100 is moving for parking. The prediction unit 73 is capable of improving prediction accuracy of the openable amount as the vehicle 100 moves closer to the parking area 60. Therefore, the notification unit 23 is capable of notifying that the openable amount after the parking has been able to be used for getting on and off before parking, but the openable amount has changed to be difficult to get on and off during movement by recalculation.

In the first embodiment described above, the direction of parking is determined using the openable amount of the door, but the present invention is not limited to such a configuration. For example, the user may determine the direction of parking. Therefore, the prediction unit 73 may determine whether the openable amount of the door corresponding to the occupant position is larger in forward parking or backward parking, and the notification unit 23 may notify the determination result of the prediction unit 73. Thus, the user can select forward parking or backward parking using the determination result of the prediction unit 73.

In the above-described first embodiment, the functions realized by the parking assistance device 20 may be realized by hardware and software different from those described above or by a combination of the hardware and the software. The parking assistance device 20 may communicate with, for example, another control device, and the other control device may execute a part or all of the process. When the parking assistance device 20 is realized by an electronic circuit, the parking assistance device 20 may be realized by a digital circuit or an analog circuit, including a large number of logic circuits.

Whereas the parking assistance device 20 is used in the vehicle 100 in the first embodiment mentioned before, the parking assistance device 20 may be used not only in a state that it is mounted on the vehicle 100, but also in a state that the parking assistance device 20 is not mounted on the vehicle 100 at least partially.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A parking assistance device for assisting automatic parking of a vehicle, comprising:
   a determination unit configured to determine a parking area for the automatic parking;
   an obstacle acquisition unit configured to acquire an obstacle around the determined parking area before the automatic parking;
   a prediction unit configured to predict an openable amount, by which a door of the vehicle is openable, based on a detection result of the obstacle acquisition unit when the vehicle is to be automatically parked in the determined parking area;
   a notification unit configured to notify the openable amount predicted by the prediction unit;
   a wireless communication unit configured to communicate with an external mobile terminal;
   a riding-position acquisition unit configured to acquire a seated position of an occupant; and
   a direction determination unit configured to determine, as a direction of the vehicle to be automatically parked, either a forward direction or a backward direction, wherein
   the prediction unit is configured to:
     predict the openable amount for both cases of forward parking and backward parking; and
     determine whether the openable amount of the door corresponding to the seated position detected by the riding-position acquisition unit is larger in forward parking or backward parking,
   the direction determination unit is configured to determine the direction of the vehicle, in which the openable amount of the door corresponding to the seated position detected by the riding-position acquisition unit, is larger compared to another direction,
   the notification unit is configured to notify the determination result of the prediction unit, and
   the wireless communication unit is configured to:
     transmit the openable amount predicted by the prediction unit; and
     display the openable amount on a predetermined mobile terminal.

2. The parking assistance device according to claim 1, wherein
   the prediction unit is configured to continuously predict the openable amount while the vehicle is moving for parking after starting the automatic parking.

3. The parking assistance device according to claim 1, wherein
   the obstacle acquisition unit is configured to detect the obstacle around a parking route when the automatic parking is performed,
   the prediction unit is configured to predict the openable amount at each point of the parking route and determine whether a user in the vehicle can get off the vehicle after the automatic parking, and
   the notification unit is configured to notify a point at which the user can get off the vehicle on the parking route when the user cannot get off the vehicle after the automatic parking.

4. The parking assistance device according to claim 1, wherein
   the obstacle acquisition unit is further configured to detect a ground condition of the parking area, the ground condition including at least a puddle, a step or a depression on a road surface, and
   the notification unit is further configured to;
     notify the ground condition detected by the obstacle acquisition unit; and
     display the ground condition on a predetermined mobile terminal.

5. The parking assistance device according to claim 1, wherein
   the direction determination unit is configured to determine to perform either the forward parking or the backward parking according to a determination result of the direction of the vehicle.

6. The parking assistance device according to claim 1, further comprising
   an image forming unit configured to generate a bird's-eye view image in which the vehicle and a periphery of the vehicle are viewed in an overhead view from above, and generate an image in which an image indicating the openable amount predicted by the prediction unit is superimposed in the parking area in the generated bird's-eye view image, wherein
   the notification unit is configured to notify the openable amount using the image generated by the image forming unit.

7. A parking assistance device for assisting automatic parking of a vehicle, comprising
   a controller configured to:
     determine a parking area for the automatic parking;
     acquire an obstacle around the determined parking area before the automatic parking;
     predict an openable amount, by which a door of the vehicle is openable, based on a detection result when the vehicle is to be automatically parked in the determined parking area;
     notify the predicted openable amount;
     communicate with an external mobile terminal;
     acquire a seated position of an occupant; and
     determine, as a direction of the vehicle to be automatically parked, either a forward direction or a backward direction, wherein
   the controller is further configured to:
     predict the openable amount for both cases of forward parking and backward parking;
     determine whether the openable amount of the door corresponding to the seated position is larger in forward parking or backward parking;
     determine the direction of the vehicle, in which the openable amount of the door corresponding to the seated position, is larger compared to another direction;
     notify the determination result;
     transmit the openable amount; and
     display the openable amount on a predetermined mobile terminal.

* * * * *